US009796627B2

(12) United States Patent
Grun et al.

(10) Patent No.: US 9,796,627 B2
(45) Date of Patent: Oct. 24, 2017

(54) EPOXY-BASED SUBSTANCE FOR FIXING PURPOSES, THE USE THEREOF AND THE USE OF SPECIFIC COMPONENTS

(71) Applicant: fischerwerke GmbH & Co. KG, Waldachtal (DE)

(72) Inventors: Jurgen Grun, Botzingen (DE); Martin Vogel, Glottertal (DE); Christian Schlenk, Denzlingen (DE); Christian Weinelt, Emmendingen (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 0 days.

(21) Appl. No.: 15/241,201

(22) Filed: Aug. 19, 2016

(65) Prior Publication Data
US 2016/0355437 A1 Dec. 8, 2016

Related U.S. Application Data

(62) Division of application No. 14/648,297, filed as application No. PCT/EP2013/003655 on Dec. 4, 2013.

(30) Foreign Application Priority Data

Dec. 11, 2012 (DE) .................. 10 2012 112 053

(51) Int. Cl.
| | | |
|---|---|---|
| C08L 63/00 | (2006.01) |
| C04B 24/28 | (2006.01) |
| C08G 59/62 | (2006.01) |
| C08G 59/02 | (2006.01) |
| C08G 59/24 | (2006.01) |
| C08G 59/56 | (2006.01) |
| C08J 5/04 | (2006.01) |

(52) U.S. Cl.
CPC ............ *C04B 24/281* (2013.01); *C08G 59/02* (2013.01); *C08G 59/245* (2013.01); *C08G 59/56* (2013.01); *C08G 59/621* (2013.01); *C08G 59/623* (2013.01); *C08J 5/04* (2013.01); *C08L 63/00* (2013.01); *C08J 2363/00* (2013.01); *C08L 2205/06* (2013.01)

(58) Field of Classification Search
CPC .... C08G 59/623; C08G 59/02; C08G 59/245; C08G 59/56; C08G 59/621; C04B 24/281; C08L 63/00; C08L 2205/06; C08J 5/04; C08J 2363/00
USPC .......................................... 523/400; 525/523
See application file for complete search history.

(56) References Cited

U.S. PATENT DOCUMENTS

| 4,481,349 A | 11/1984 | Marten et al. |
|---|---|---|
| 5,387,266 A * | 2/1995 | Loper .................. C07C 275/10 |
| | | 44/415 |
| 5,906,864 A | 5/1999 | Osterhold et al. |
| 6,329,473 B1 * | 12/2001 | Marten .................. C08G 59/10 |
| | | 525/438 |
| 2001/0035111 A1 | 11/2001 | Gienau et al. |
| 2006/0003166 A1 | 1/2006 | Wissing et al. |
| 2007/0119745 A1 | 5/2007 | Vogel et al. |
| 2012/0010329 A1 | 1/2012 | Hunter et al. |
| 2012/0172493 A1 | 7/2012 | Dettloff et al. |
| 2014/0179890 A1 | 6/2014 | Fredrich et al. |

FOREIGN PATENT DOCUMENTS

| CN | 102549041 A | 7/2012 | |
|---|---|---|---|
| DE | 32 33 565 A1 | 3/1984 | |
| DE | 196 25 344 A1 | 1/1998 | |
| DE | 10 2004 008 464 A1 | 9/2005 | |
| DE | 60 2005 002 755 T2 | 7/2008 | |
| DE | 10 2011 015 193 A1 | 9/2012 | |
| EP | 0 870 790 A1 | 10/1998 | |
| EP | 0 872 504 A1 | 10/1998 | |
| JP | 2008-088348 A | 4/2008 | |
| JP | 2008088348 A * | 4/2008 | ............ C08G 59/62 |
| WO | WO 2005/090433 A1 | 9/2005 | |

OTHER PUBLICATIONS

Yoshida et al., JP 2008-088348 a machine translation in English, Apr. 17, 2008.*
International Search Report and Written Opinion for corresponding International Application No. PCT/EP2013/003655 dated Apr. 2, 2014.
German Search Report issued Jul. 16, 2013 for related German Application No. 10 2012 112 054.4.
International Preliminary Report on Patentability for corresponding International Application No. PCT/EP2013/003655 dated Jun. 16, 2015.
Xuingwei et al., "Mannich Modification Study on Methylcyclopentadienylamine", China Adhesives, vol. 21(5), pp. 61-62, published on May 31, 2012 (a Chinese text).

* cited by examiner

*Primary Examiner* — David T Karst
(74) *Attorney, Agent, or Firm* — Renner, Otto, Boisselle & Sklar, LLP

(57) ABSTRACT

Compositions for a curable substance for fixing purposes, comprising an epoxy component (a), which contains curable epoxides, and a hardener component (b), which comprises a Mannich base formulation, obtainable by reaction of specific amines, and/or mixtures of styrenated phenols with low molecular weight amines, to novel Mannich base formulations or mixtures of styrenated phenols with low molecular weight amines, and to the use of such Mannich base formulations and/or of such mixtures of styrenated phenols with low molecular weight amines, and in each case especially further additional ingredients, especially in hardener components for epoxy resins.

13 Claims, No Drawings

EPOXY-BASED SUBSTANCE FOR FIXING PURPOSES, THE USE THEREOF AND THE USE OF SPECIFIC COMPONENTS

CROSS REFERENCE TO RELATED APPLICATIONS

This is a divisional application of U.S. patent application Ser. No. 14/648,297 filed May 29, 2015, which is a national phase of International Application No. PCT/EP2013/003655 filed Dec. 4, 2013, which claims priority to DE 10 2012 112 053.6 filed Dec. 11, 2012, the contents of which are hereby incorporated herein by reference.

TECHNICAL FIELD OF INVENTION

The invention relates to compositions for a curable substance for fixing purposes, comprising an epoxy component (a), which contains curable epoxides, and a hardener component (b), which comprises a Mannich base formulation, obtainable by reaction of specific amines, and/or mixtures of styrenated phenols with low molecular weight amines; to novel Mannich base formulations or mixtures of styrenated phenols with low molecular weight amines, and to the use of such Mannich base formulations and/or of such mixtures of styrenated phenols with low molecular weight amines, and in each case especially further additional ingredients, especially in hardener components for epoxy resins.

DISCUSSION OF RELATED ART

Hardenable multi-component (such as two-component) epoxy-based substances are known in principle. For example, they can be used in the production of lacquers, in the production of coatings and as moulding compounds and the like.

Synthetic mortar substances based on epoxy resins and amine hardeners are also known in the fixings sector, for example for the fixing of anchoring means, such as anchor rods.

Statutory regulations mean that an increasingly small number of amines can be used without major restrictions for the formulation of hardeners for epoxy resins in the fixings field, especially in the building sector. The remaining amines often provide only very little scope or poor scope for establishing desirable properties (high bond stress, high pull-out values, rapid curing, high thermal strength, curing even at low temperature, water-resistance for use in a wet substrate (for example wet concrete), chemical stability and so forth) that should be achievable in the finished products.

In particular, the achievement of high bond stresses, and also the improvement of one or more of the other properties mentioned, by the provision of new components and, in particular, new amine components as hardeners, therefore remain objectives to be pursued.

SUMMARY OF THE INVENTION

The problem of the present invention is therefore to provide new epoxy resins for fixing purposes, especially in the building sector, which make it possible to achieve properties that are advantageous in comparison with the epoxy resins known hitherto, especially one or more of the properties improved, as above, in comparison with known substances, and more especially high pull-out values and high bond stresses, in particular also at elevated temperatures.

Surprisingly, it has now been found that this problem can be solved by the use of special Mannich base formulations as amine hardeners, it being possible for such Mannich base formulations to be produced using very specific amines; and/or by the use of mixtures of styrenated phenols with low molecular weight amines.

The "specific amines" to be used according to the invention are especially cycloaliphatic or heterocycloaliphatic di- or poly-amines, in which at least one amino group, but better all amino groups, is/are not bonded directly to the cycloaliphatic or heterocycloaliphatic nucleus but bonded thereto via a linker with a spacing one or more atoms (carbon and/or hetero atoms).

Without wishing to be bound to this explanation, it appears that the additional degrees of freedom of movement resulting from the short-chain/not excessively long-chain linker molecule portions, which could give rise to better reactivity, in combination with the cyclic constituents of the amine molecules, which contribute a stable, more or less rigid structure, contribute to the advantages observed, such as, especially, good bond stresses.

The "specific amines" to be used according to the invention are in particular those of the formula

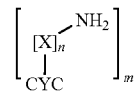

wherein

"CYC" is a monocyclic saturated ring having from 3 to 12 ring atoms or a condensed di- or (further) poly-cyclic saturated ring system having from 6 to 12 ring atoms, wherein in each case the ring atoms are selected from 0 to 3 nitrogen atoms, 0 to 3 oxygen atoms and 0 to 1 sulfur atoms and from carbon atoms;

X is $CH_2$, wherein for each group $-[X]_n-NH_2$ one X can be NH, O or S, with the proviso that in the case of X=O or S, n is at least 2 and the O or S is not bonded directly to a nitrogen atom present in the group $-[X]_n-NH_2$ and in the case of one X=NH, n is at least 2 and the X=NH is bonded neither directly to a nitrogen ring atom nor to a nitrogen atom present in the group $-[X]_n-NH_2$ in question;

n is from 0 to 5, with the proviso that at least in one of the groups $-[X]_n'NH_2$ n is from 1 to 5; wherein generally n=1 to 3, especially n=1, is preferred; and m is a whole positive number greater than or equal to 2, especially 2 to 3;

or salts thereof.

The constituent $[X]_n$ is one of the mentioned linkers.

Preferred compounds of this type are N,N'-bis(3-amino-n-propyl)piperazine (BAPP), 1,3-bis(aminomethyl)cyclohexane (BAC) or, further, N-(2-aminoethyl)piperazine (AEP) or 3-aminomethyl-3,5,5-trimethylcyclohexylamine (isophoronediamine=IPDA).

Special preference is given to 1,3-bis(aminomethyl)cyclohexane (BAC) of the formula

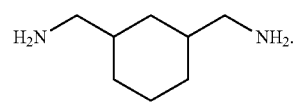

In comparison with Mannich base formulations from the prior art used hitherto, which do not fall under this definition because they differ in at least one, especially two and more especially all of the mentioned parameters, the multi-component mortars which can be produced according to the invention exhibit significantly higher bond stress after curing, even at relatively high temperatures, such as at 80° C., so that they are still usable even at such a temperature. Furthermore, even on being cured at −5° C. they generally exhibit better, or at least equally good, bond stresses in comparison with mortars produced using Mannich base formulations from the prior art employed hitherto.

The Mannich bases to be used according to the invention are the reaction products of phenols, such as phenol, pyrocatechol, resorcinol, hydroquinone, hydroxyhydroquinone, phloroglucinol, pyrogallol, o-cresol, m-cresol, p-cresol, or bisphenols, such as bisphenol F or bisphenol A, especially phenol, or of styrenated phenols, as defined hereinbelow, with the "specific amines" defined hereinabove and aldehydes, or compounds yielding aldehydes by decomposition, especially aliphatic aldehydes, such as, in particular, formaldehyde (which term can also include compounds yielding formaldehyde by decomposition, such as trioxane or paraformaldehyde), the aldehydes advantageously being added and reacted in the form of an aqueous solution (especially at elevated temperature, such as at from 50 to 90° C.).

According to the invention, the preparation of the Mannich bases can be effected in accordance with methods known per se, using the above-defined "specific amines".

For example, they can be carried out as follows, for example using the amines mentioned in the Examples (the specific details (characterised by "e.g." and "for example") refer to the Mannich bases used in the Examples):

Amine (e.g. 2 mol) is introduced as initial charge (for example in a 250 ml three-necked flask equipped with a thermometer, a dropping funnel and a stirring device). With stirring, phenol or styrenated phenol (e.g. 1 mol) is added to the amine initially introduced. Heating is carried out (e.g. at 80° C.). When the temperature has been reached (e.g. within a period of 45 min) formaldehyde is added dropwise (e.g. 0.7 mol in the form of 37% formaldehyde solution), especially with vigorous stirring. When addition is complete, further heating is carried out (for example at 105° C.) and the reaction conditions are maintained for a period of time (e.g. 120 min). Water is then distilled off—for example under an increasing vacuum—at a suitable temperature (e.g. about 110° C.); as soon as the pressure has fallen sufficiently (e.g. to 50 mbar), the temperature is increased again (e.g. to 130° C.) and then maintained for a period of time (e.g. 60 min). The resulting product is the Mannich base formulation which can contain further additional ingredients selected from benzyl alcohol, further (styrenated) phenol, further amine for dilution. Such additional constituents of the Mannich base total formulation can be up to a maximum of 15% by weight benzyl alcohol, up to a maximum of 30% by weight free phenol component (e.g. also styrenated phenol) and up to a maximum of 75% by weight free amine, based on the mass of the Mannich base formulation.

The "low molecular weight amines" to be used in the mixture with styrenated phenols (which amines can be present as such or in salt form) are the above-mentioned "specific amines", especially those mentioned as being preferred, or other low molecular weight polyamines ("polyamines" also including diamines), especially oligomeric or monomeric aliphatic, cycloaliphatic, cycloheteroaliphatic, aromatic or araliphatic diamines, such as especially xylylenediamines, more especially m-xylylenediamine (1,3-bis(aminomethyl)benzene, MXDA); aliphatic polyamines, for example $C_1$-$C_{10}$alkane-di- or -polyamines, e.g. 1,2-diaminoethane, trimethylhexane-1,6-diamine, diethylenetriamine or triethylenetetraamine; oligomeric diamines of the formula $H_2N$—$(CH_2)_i$—$NH$—$[(CH_2)_j$—$NH]_k$—$(CH_2)_l$—$NH_2$, wherein i, j and l are each independently of the others from 2 to 4 and k is 0, 1 or 2, especially "triethylenetetramine" (TETA=N,N'-bis(2-aminoethyl)ethylenediamine) or tetraethylenepentamine (TEPA); cycloaliphatic amines, such as 1,2-diaminocyclohexane or bis(aminomethyl)tricyclodecane (TCD) or bis(4-aminocyclohexyl)methane (PACM), or amine adducts; or mixtures of two or more thereof; especially mixtures of one or more araliphatic diamines, more especially m-xylylenediamine, with one or more other polyamines, especially BAC, or more especially one or more araliphatic diamines, especially m-xylylenediamine itself, or mixtures of BAC and m-xylylenediamine.

Surprisingly, it has been found that instead of using Mannich base formulations the preparation of which involves the reaction of phenols and the "specific amines", it is possible to use simply mixtures of (i) styrenated phenols with (ii) the "low molecular weight amines". Here too, the mentioned advantages are achieved. It is also possible for the preparation of the mentioned mixtures, by mixing components (i) and (ii) or mixtures containing them with further additional ingredients, not to take place until at the site of use. Furthermore, a further advantage over mixtures with Mannich bases is that a relatively low viscosity can be achieved without taking further measures.

Styrenated phenols are to be understood as being the reaction products (electrophilic substitution products) of phenols (such as phenol, pyrocatechol, resorcinol, hydroquinone, hydroxyhydroquinone, phloroglucinol, pyrogallol, o-cresol, m-cresol or p-cresol, especially phenol) with styrene or styrene analogues, such as vinyltoluene, divinylbenzene or 4-vinylpyridine, especially with styrene, especially "styrenated phenol" itself (reaction product of styrene and phenol; CAS Reg. No. 61788-44-1), which, by way of example, can contain mixtures of compounds or individual compounds of the following formulae:

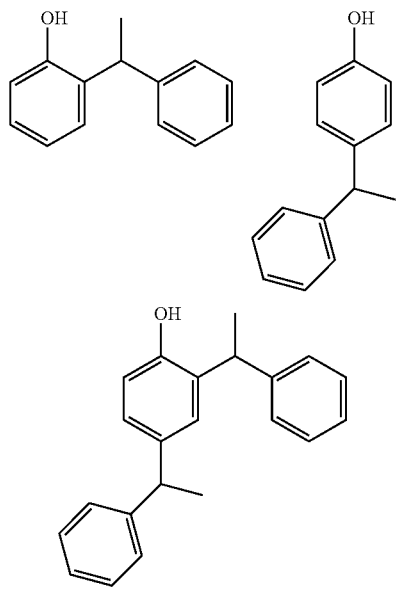

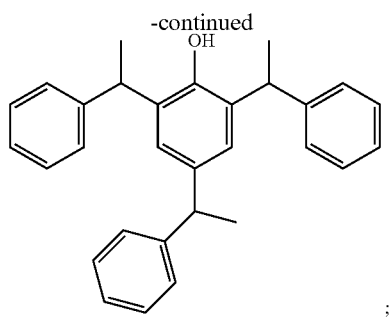

;

or 2,6-distyryl phenol, and also oligo- and poly-styrene portions or compounds (oligomeric or polymeric products obtained from cationic polymerisation of styrenes in phenols), for example of the formula

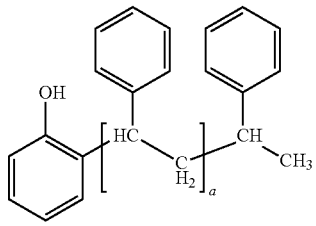

wherein a is 1 or a larger whole number, or branching products—in general, mixtures of a plurality of products formed during the reaction (including poly-substituted products) are obtained, so that the mentioned formulae are at most to be understood as being exemplary and are not necessarily—at least not in all cases—obtained as such.

Parameters, insofar as they are described in the context of the present application, are determined as follows in accordance with methods known to the person skilled in the art:

For the production of test specimens for compression and tension tests, the epoxy resin component (example of a component (a) to be used according to the invention) is mixed with the corresponding Mannich base or mixture of styrenated phenol and low molecular weight amine (example of a component (b) to be used according to the invention) in stoichiometric amounts (the mixture stoichiometry is determined by the epoxy equivalent values and the H equivalents by calculation (e.g. from manufacturer's data)) and cured for 24 h at room temperature (about 23° C.). The epoxy resin component in the Examples is a mixture of 40% by weight bisphenol A/F diglycidyl ether, 15% by weight trimethylolpropane triglycidyl ether and 45% by weight Portland cement. Further additional ingredients are possible.

To determine the compressive strength (in accordance with DIN EN ISO 604), a cylindrical test specimen is produced. The test specimen has the following dimensions: diameter 12 mm, length 40 mm. When curing is complete, the test specimen is axially compressed parallel to its main axis at a constant rate of 1 mm/min until it breaks or until the stress or decrease in length has reached a pre-set value. During the operation the force absorbed by the test specimen is measured. The compressive strength is the maximum compressive stress borne by a test specimen during a compression test.

To determine the tensile properties (tensile strength—in accordance with DIN EN ISO 527), a dumbbell test specimen in accordance with DIN EN ISO 527-2 Type 1BA is produced. For testing, the test specimen is clamped in a jig and stretched along its main axis at a constant rate of 5 mm/min until it breaks. During this operation, the load borne by the test specimen and the change in length are measured. The tensile strength is the maximum stress borne by the test specimen during a tensile test.

For pull-out tests using threaded rods M12 the following procedure, in accordance with ETAG 001 PART 5, is carried out:

First of all, a hammer drill and a hammer drill bit are used to drill holes (diameter 14 mm; depth 72 mm) in a concrete test specimen (concrete type C20/25) lying in a horizontal position. The drilled holes are cleaned using a hand blower and a hand brush. Starting from the base, the drilled holes are then filled two-thirds full with the particular curable substance for fixing purposes to be tested (Mannich base and/or mixture of styrenated phenols with the specific amines, in the form of an epoxy resin component a mixture of 40% by weight bisphenol A/F diglycidyl ether, 15% by weight trimethylolpropane triglycidyl ether and 45% by weight Portland cement). A threaded rod is pushed into each drilled hole by hand. The excess mortar is removed using a trowel. After 24 hours (minimum curing time) at room temperature, the threaded rod is subject to pulling until it fails, the failure load being measured.

The measurement of the viscosities is carried out with a Brookfield rotational viscometer using spindle 3 at 23° C. at from 10 to 50 rev/min, preferably 10 rev/min.

The measurement of the glass transition temperature (an indirect measure inter alia of the thermal dimensional stability) is effected by means of dynamic differential calorimetry (DSC) in accordance with ISO 11357-2 on samples cured for 24 h.

The glass transition temperature or glass transformation temperature (the temperature above which the solid, glassy material changes into a softer, rubber-like material), which is a measure of the usability of the cured mortars at high temperatures, is increased according to the invention and accordingly their scope for use, even at high temperatures, can be further enhanced.

The permissible temperature range for the cured product can likewise be determined by pull-out tests after treatment with different temperatures (for example 24 h curing at room temperature, at 50° C. and/or at 80° C.).

Instead of the term "curable substance" the term "mortar" is also used in some instances hereinbelow.

The mixtures according to the invention can be used in the form of single-component systems or preferably in the form of multi-component systems (with separation especially of component (b), which contains hardener=Mannich base or mixture of styrenated phenol with low molecular weight amine to be used according to the invention, from component (a), which contains epoxy compound(s), e.g. in different compartments of a container or in a plurality of containers in a common packaging, so that they are unable to react with one another prior to use for fixing purposes), for example in the form of a multi-component kit.

A multi-component kit (or set) is to be understood as being especially a two-component kit (preferably a two-component kit containing components (a) and (b)), preferably a two-chamber or, further, multi-chamber device, in which the components (a) and (b) that are capable of reacting with one another are contained in such a way that they are unable to react with one another during storage, the components preferably being contained in such a way that they do not come into contact with one another prior to use.

Capsules are a possibility. Especially suitable, however, are cartridges or foil sachets having two or more chambers, or containers, such as buckets or tubs, having a plurality of chambers, or sets (e.g. bundles) of two or more such containers, wherein two or more components of the curable substance in question, especially two components (a) and (b) as defined above and below, are physically separated from one another, in the form of a kit or set in which the contents, after being mixed together or while being mixed together, are applied to the site of use (especially by means of application tools such as trowels or brushes or a static mixer), for example are applied to a surface for the fixing of fibres, non-crimp fabrics, woven fabrics, composites or the like, or introduced into a cavity, such as a drilled hole, especially for the fixing of anchoring means, such as anchor rods or the like; and also multi-component or, especially, two-component cartridges, the chambers of which contain the plurality of components or, preferably, two components (especially (a) and (b)) for a curable substance for fixing purposes having the compositions mentioned hereinabove and hereinbelow, for storage prior to use, such a kit preferably also including a static mixer. In the case of foil sachets and multi-component cartridges, the multi-component kit can also include a discharge device, but this can preferably also be separate from the kit (for example for multiple use).

Unless otherwise indicated, hereinabove and hereinbelow proportions or contents given in percent relate to percent by weight in each case.

For example, a single-component or multi-component kit, especially a two-component kit, as described hereinabove and especially hereinbelow, is a possible embodiment preferred for use, wherein, based on the total weight of the mortar component (b) introduced, the Mannich base formulation has a proportion of from 10 to 100% by weight, preferably from 30 to 75% by weight.

A single-component or multi-component kit, especially a two-component kit, in which the mixture of styrenated phenols and low molecular weight amines, based on the total weight of the mortar component (b) introduced, has a proportion of from 10 to 100% by weight, preferably from 30 to 75% by weight, is likewise a preferred embodiment, as is also the use thereof.

Special preference is also given to a multi-component kit as described hereinabove and hereinbelow and especially to the use thereof according to the invention, characterised in that the Mannich base formulation or the mixture of styrenated phenols and low molecular weight amines has H equivalents in the range of from 30 to 105 and a viscosity in the range of from 50 to 10,000 mPa·s, and preferably a content of free phenol of 20% by weight or less, for example of less than 1% by weight, e.g. of 0.1% by weight or less, based on the Mannich base formulation or the mixture of styrenated phenols and low molecular weight amines.

The determination of the H equivalents (amount of resin that contains 1 mol of reactive H) is effected in a manner known to the person skilled in the art, with reference to the formulation of the reaction mixture, from the known H equivalents of the starting materials and raw materials used, from which they are calculated.

For a simple amine, the calculation of the H equivalent will be explained, purely by way of example, using the example of meta-xylylenediamine:
General formula:

$$H\ eq. = \frac{Mw}{functionality}$$

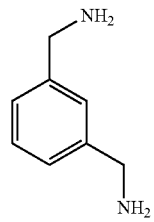

$$\text{applied: } H\ eq. = \frac{136}{4}\left[\frac{g}{eq}\right] = 34\left[\frac{g}{eq}\right]$$

The epoxy equivalent values are generally indicated on the starting materials by the manufacturers or they are determined or calculated in accordance with known methods. They indicate the amount in g of resin that contains 1 mol of epoxy groups.

In a multi-component kit, especially a two-component kit, according to the invention or for use according to the invention, as described hereinabove and hereinbelow, in an advantageous embodiment of the invention the ratio by volume of components (a) to (b) is 10 to "1 or less", especially 5 to "1 or less", preferably 3 to "1 or less", the lower limit advantageously being 1 in each case.

Curable epoxy resins (present in component (a) in the case of multi-component systems) are preferably polyglycidyl ethers of at least one polyvalent alcohol or phenol, such as novolak, or especially bisphenol F or bisphenol A, or mixtures of two or more of those compounds, or other aromatic or heteroaromatic glycidyl ethers having an epoxy functionality of at least 2 or especially tri- or higher glycidyl ethers, or likewise mixtures of two or more of all the mentioned alternatives. The epoxy resins have, for example, an epoxy equivalent of from 100 to 2000, preferably from 120 to 400. The proportion in the epoxy component (a) is >0 to 100%, preferably from 10 to 60%.

In addition to the constituents mentioned hitherto, the mortars according to the invention or for use according to the invention (especially multi-component kits), as mentioned hereinabove and hereinbelow, may contain further customary additional ingredients in one or more of their components (especially component (a), (b) or (a) and (b)) (the person skilled in the art will know to what extent such constituents should not come into contact with the components of a multi-component kit according to the invention or in accordance with the invention, such as especially a two-component kit with the components (a) and (b), prior to mixing for use).

As reactive diluents (which should not be present in a hardener component, that is to say are preferably contained (in the case of a two-component system solely) in component (a)) there can be used glycidyl ethers of aliphatic, cycloaliphatic, araliphatic or aromatic mono- or especially poly-alcohols, such as monoglycidyl ethers, e.g. o-cresyl glycidyl ether, and/or especially glycidyl ethers having an epoxy functionality of at least 2, such as 1,4-butanediol diglycidyl ether, cyclohexanedimethanol diglycidyl ether, hexanediol diglycidyl ether and/or especially tri- or higher glycidyl ethers, e.g. glycerol triglycidyl ether, pentaerythritol tetraglycidyl ether or trimethylolpropane triglycidyl ether, or, further, mixtures of two or more of those reactive diluents. Special preference is also given to glycidyl silanes, e.g. according to WO 2011/113533. The reactive diluents are preferably present in amounts of from 0 to 60% by weight, especially from 1 to 30% by weight, based on the total weight of the epoxy component (a).

Fillers can be present in one or more components, for example of a multi-component kit according to the invention, for example in one or both components of a corresponding two-component kit; the proportion of fillers is preferably from 0 to 90% by weight, for example from 10 to 90% by weight.

As fillers there are used customary fillers, such as hydraulically curable fillers, such as gypsum, quicklime, water glass or active aluminium hydroxides, or especially cements, such as Portland cement or high-alumina cements, chalks, quartz powder, corundum or the like, which can be added in the form of powder, in granular form or in the form of shaped bodies, or other fillers, such as mentioned, for example, in WO 02/079341 and WO 02/079293 (which in this regard are incorporated herein by reference), or mixtures thereof; it being further or especially possible for the fillers also to be silanised, for example in the form of amino- or epoxy-silane-treated quartz powder, such as Silbond AST or EST® from Quarzwerke GmbH, in the form of amino- or glycidyl-silane-treated silica, such as Aktisil AM or EM® from Hoffmann Mineral, or amino- or glycidyl-silane-treated pyrogenic silicic acids. The fillers can be present in one or more components of a multi-component kit according to the invention, for example in one or both components (a) and (b) of a corresponding two-component kit; the proportion, based on the total weight of the curable substance, is preferably from 0 to 70% by weight, preferably from 5 to 60% by weight.

As further additional ingredients for individual components or for a plurality of components of the compositions according to the invention or for use according to the invention there can be present plasticisers, non-reactive diluents or flexibilisers, stabilisers, catalysts, such as e.g. curing catalysts (for example salicylic acid), rheology auxiliaries, thixotropic agents, agents for controlling the reaction rate, e.g. accelerators, wetting agents, colouring additives, such as dyes or especially pigments, for example for staining the components different colours for better monitoring of the intermixing thereof, or additives, or the like, or mixtures of two or more thereof. Such further additional ingredients can preferably be present, in total, in proportions by weight of in total from 0 to 30%, for example from 0 to 5%, based on the total curable substance. They can be present in individual components or in a plurality of components, e.g. (a) and/or (b), or in the Mannich base formulation (which is accordingly to be referred to as an "extended Mannich base formulation") or can have been added to the mixtures of styrenated phenols with low molecular weight amines themselves.

In a special embodiment, the invention relates to the use of a Mannich base, as described above, in the production of hardeners for epoxy resins, especially having an enlarged processing temperature range, for increasing the load-bearing capacity at temperatures above room temperature or above 50° C., and/or for increasing the bond stress in the cured state, even at high temperatures, for example at from 70 to 80° C., in comparison with other Mannich bases, such as especially those produced with 1,2-diaminocyclohexane as amine.

A variant of the invention relates to the use of the Mannich bases mentioned above (especially as described above further as being preferred) or mentioned in the Examples in a multi-component kit characterised above and below as being preferred.

In a further embodiment, the invention relates also to a curable substance or especially to the use thereof in fixing, which curable substance contains an epoxy component (a) which contains curable epoxides (epoxy component), and a hardener component (b) which comprises a mixture of styrenated phenols with low molecular weight amines.

In a further embodiment, the invention relates also to the use of a mixture of styrenated phenols with low molecular weight amines as hardener component in the production of a curable substance having curable epoxides for fixing purposes. Herein the mixture of styrenated phenols with low molecular weight amines and the curable epoxides are mixed together and brought to reaction, preferably on-site, with the fixing of fixing elements, such as anchoring elements, taking place simultaneously or immediately afterwards.

An embodiment of the invention relates also to the use of a Mannich base described hereinabove and hereinbelow in the production of a composition, especially the hardener component of a multi-component kit containing the components of such a composition, for the fixing of anchoring elements in drilled holes.

An embodiment of the invention relates also to the use of a mixture of one or more styrenated phenols with one or more low molecular weight amines, as described hereinabove and hereinbelow, in the production of a composition, especially the hardener component of a multi-component kit containing the components of such a composition, for the fixing of anchoring elements in drilled holes.

In a further embodiment, the invention relates also to the use of a mixture of styrenated phenols with low molecular weight amines as hardener component in the production of a curable substance containing curable epoxides for fixing purposes for increasing the load-bearing capacity at temperatures above room temperature or above 50° C., and/or for increasing the bond stress in the cured state in comparison with corresponding curable substances without the styrenated phenols.

Enhanced thermal stability results, for example, in better scope for use for fixing purposes, even in the event of relatively high temperatures e.g. in the drilled hole region of façade anchorings that are exposed to strong sunlight or otherwise increased temperatures.

Further additional ingredients are possible, for example tertiary amino compounds, organic acids, such as carboxylic acids, e.g. salicylic acid, or sulfonic acids, e.g. p-toluenesulfonic acid, advantageously a tert-aminophenol (preferably added to component (b)), especially a 2,4,6-tris(di-$C_1$-$C_6$alkylamino)phenol, preferably 2,4,6-tris(dimethylamino) phenol, in hardener components (b) (especially containing Mannich base formulations used according to the invention) as a constituent of (especially multi-component, such as two-component) epoxy mortars.

In further advantageous embodiments, the invention relates also to the use of curable substances according to the invention, especially in the form of multi-component kits, especially two-component kits, for the fixing of fibres, non-crimp fabrics, woven fabrics or composites, especially made of high-modulus fibres, preferably of carbon fibres, especially for reinforcement of buildings, for example of walls or ceilings or floors; or, further, for the fixing of building components, such as panels or blocks, e.g. made of stone, glass or plastics, to structures or building components; but especially for the fixing of anchoring means, such as anchor rods, bolts or the like, in cavities, such as drilled holes, wherein the components of the multi-component kit, after being mixed beforehand and/or while being mixed (for example by means of a static mixer or by rupturing a capsule or foil sachet or by mixing components from multi-chambered buckets or sets of buckets) are applied to the surface of a substrate or, in the case of anchoring means, introduced into cavities, such as drilled holes, in a substrate (e.g. masonry or concrete, or wood or metal).

The invention relates especially to those variants of the embodiments of the invention in which the compositions are not aliphatic monoamines, or are not (meth)acrylate copolymers or they are non-aqueous, or those variants wherein two or more of those properties are realised.

EXAMPLES

The following Examples serve to illustrate the invention but do not limit the scope thereof:

Abbreviations used:
AEP N-(2-aminoethyl)piperazine
BAC 1,3-bis(aminomethyl)cyclohexane
BAPP N,N'-bis(3-amino-n-propyl)piperazine
DCH (comparison) 1,2-diaminocyclohexane
IPDA 3-aminomethyl-3,5,5-trimethylcyclohexylamine
MXDA m-xylylenediamine
TETA triethylenetetramine
$T_g$ glass transition temperature

Example 1

Mortars Obtained with Mannich Base Formulations? for use According to the Invention and, as Comparison Tests, with Mannich Bases that have been Obtained Using Amines Already Known in the Fixings Sector Using the amines AEP, BAC, BAPP, IPDA and, as comparison, DCH, the corresponding Mannich base formulations were produced as described at the beginning. The formulations were mixed together with epoxy resin component and Portland cement in stoichiometric amounts in accordance with the following Table.

An epoxy resin based on bisphenol A/F having a viscosity of 6000-8000 mPas/25° C. and an epoxy equivalent of 175 is mixed, in the amount indicated in the Table, with a further epoxy resin based on trimethylolpropane having a viscosity of 120-180 mPas/25° C. and an epoxy equivalent of 140, likewise in the amount indicated in the Table. The mixture, consisting of the two epoxy resins and the filler dispersed therein, is hardened at RT for 24 h with the amount of the respective Mannich base corresponding to the hydrogen equivalent, as listed in the following Tables (e.g. stoichiometrically in this case, but greater or lesser crosslinking can also be chosen).

Mortar component A (corresponding to (a) in the general part) is produced in accordance with the following formulation:

| Ingredient | EP equivalent | Hydrogen equivalent | Weight introduced [g] | Percent by weight [%] |
|---|---|---|---|---|
| EP resin based on bisphenol A/F | 175 | — | 20.00 | 40.00 |
| EP resin based on trimethylolpropane | 140 | — | 7.50 | 15.00 |
| Cement | — | — | 22.50 | 45.00 |
| Total | | | 50.00 | 100.00 |

(1) Analogously, the following amounts of component B, based on 50 g of component A, are weighed out and introduced (Mannich bases based on phenol and corresponding amine in brackets):

| Ingredient | Hydrogen equivalent | Weight introduced [g] |
|---|---|---|
| MB 1 (BAC) | 53 | 8.90 |
| MB 2 (BAPP) | 69 | 11.58 |
| MB 3 (AEP) | 68 | 11.41 |
| MB 4 (IPDA) | 61 | 10.24 |
| MB 5 (DCH comparison example not according to the invention) | 45 | 7.55 |

(2) Alternatively, the following amounts of component B, based on 50 g of component A, are weighed out and introduced (Mannich bases based on styrenated phenol and corresponding amine in brackets):

| Ingredient | Hydrogen equivalent | Weight introduced [g] |
|---|---|---|
| MB 6 (BAC) | 77 | 12.93 |
| MB 7 (BAPP) | 92 | 15.44 |
| MB 8 (AEP) | 101 | 16.95 |
| MB 9 (IPDA) | 84 | 14.10 |
| MB 10 (DCH comparison example not according to the invention) | 69 | 11.58 |

The components listed here are weighed out and introduced in succession and carefully mixed together. The resulting mixture is then introduced into the corresponding moulds and hardened at RT for 24 h and then tested.

The following measured values are obtained:

In the case of mixtures containing component B according to (1) with Mannich base from phenol itself and the amine indicated in each case:

| Amine | Compressive strength [MPa] | Tensile strength [MPa] | $T_g$ [° C.] | Viscosity [mPas] | Pull-out [kN] | Bond stress [n/mm²] |
|---|---|---|---|---|---|---|
| BAC (MB1) | 81 | 39 | 52 | 314 | 87 | 32 |
| BAPP (MB2) | 75 | 39 | 48 | 774 | 53 | 20 |
| AEP (MB3) | 69 | 29 | 50 | 497 | 70 | 26 |
| IPDA (MB4) | 66 | 11 | 44 | 1990 | 81 | 29 |
| DCH (MB5) | 66 | 6 | 43 | 203 | 58 | 22 |

Compared with the comparison using DCH, which is not according to the invention, increased pull-out and bond stress values and increased $T_g$ values (being an indirect measure of increased thermal dimensional stability) as well as increased tensile strength in all cases and increased compressive strength in almost all cases are observed, with comparable viscosities.

In the case of mixtures containing component B according to (2) with Mannich base from styrenated phenol and the amine indicated in each case:

| Amine | Compressive strength [MPa] | Tensile strength [MPa] | $T_g$ [° C.] | Viscosity [mPas] | Pull-out [kN] | Bond stress [n/mm²] |
|---|---|---|---|---|---|---|
| BAC (MB6) | 73 | 20 | 50 | 1259 | 83 | 28 |
| BAPP (MB7) | 68 | 30 | 50 | 2108 | 77 | 28 |
| AEP (MB8) | 59 | 5 | 47 | 2200 | 76 | 27 |
| IPDA (MB9) | 40 | 6 | 37 | 9427 | 52 | 19 |
| DCH (MB10) | 54 | 5 | 32 | 1720 | 34 | 12 |

Compared with the comparison using DCH, which is not according to the invention, increased pull-out and bond stress values and increased $T_g$ values (being an indirect measure of increased thermal dimensional stability) as well as increased or identical tensile strength in all cases and increased compressive strength in almost all cases are observed, with comparable viscosities.

Example 2

Mortars Obtained with Mixtures of Styrenated Phenol and Low Molecular Weight Amine According to the Invention and for Use According to the Invention (3) Alternatively, the following amounts of component B, based on 50 g of component A as described above, are weighed out and introduced: (hardener without Mannich bases)

| Ingredient | Hydrogen equivalent | Weight introduced [g] |
|---|---|---|
| Mixture 1 (MXDA/BAC) | 47 | 7.89 |
| Mixture 2 (BAC) | 47 | 7.89 |
| Mixture 3 (MXDA) | 45 | 7.55 |
| Mixture 4 (IPDA) | 57 | 9.57 |
| Mixture 5 (TETA) | 32 | 5.37 |

Using the amines BAC in admixture with MXDA (14 parts by weight BAC to 1 part MXDA); BAC; MXDA; IPDA; and TETA, in each case there was produced a mixture consisting of the amine in question (without the presence of Mannich base), styrenated phenol (Novares LS 500) and salicylic acid in a mixing ratio of 75:20:5 (w/w). The mixtures were mixed in stoichiometric amounts (in respect of the functionalities amino and epoxy) with component A (see Table in Example 1) and used as a "curable substance" as described above for the parameter determination.

Using the methods of parameter determination described at the beginning, the following results were obtained:

| Amine | Compressive strength [MPa] | Tensile strength [MPa] | $T_g$ [° C.] | Viscosity [mPas] | Pull-out [kN] | Bond stress [n/mm²] |
|---|---|---|---|---|---|---|
| BAC + MXDA | 83 | 30 | 51 | 72 | 96 | 34 |
| BAC | 83 | 38 | 50 | 72 | 82 | 30 |
| MXDA | 84 | 39 | 50 | 58 | 90 | 33 |
| IPDA | 66 | 12 | 44 | 311 | 76 | 28 |
| TETA | 70 | 36 | 45 | 140 | 46 | 17 |

The mentioned mixtures exhibit very good values which, for the most part, are even higher than when Mannich bases are used in Example 1.

The invention claimed is:

1. A method for embedding an anchoring element in mortar in a hole or cavity in masonry or concrete, the method comprising:
   introducing into the hole or crevice a fixing mortar comprising a non-aqueous composition, the non-aqueous composition comprising an epoxy component (a), which contains curable epoxides, and a hardener component (b), which comprises
   (i) a Mannich base formulation obtainable by reaction of one or more specific amines with phenols and aldehydes, the specific amines being those of the formula

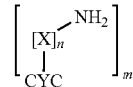

wherein
   "CYC" is a monocyclic saturated ring having from 3 to 12 ring atoms or a condensed dicyclic saturated ring system having from 6 to 12 ring atoms, wherein in each case the ring atoms are selected from 0 to 2 nitrogen atoms, 0 to 1 oxygen atoms and 0 to 1 sulfur atoms and from carbon atoms;
   X is $CH_2$, NH, O or S, wherein for each group $—[X]_n—NH_2$ one or zero X is NH, O or S, with the proviso that in the case of an X=O or S, in the group $—[X]_n—NH_2$ in question n is at least 2, and the O or S is not bonded directly to a nitrogen atom, and in the case of an X=NH, n is at least 2 and the X=NH is bonded neither directly to a nitrogen ring atom nor to a nitrogen atom present in the group $—[X]_n—NH_2$ in question;
   n is from 0 to 5, with the proviso that in at least one of the groups $—[X]_n—NH_2$, n is from 1 to 5; and
   m is a whole positive number greater than or equal to 2;
   or salts thereof,
   or the specific amine is 4-(2-aminoethyl)piperazine;
   wherein the phenols are styrenated phenols;
   and/or
   (ii) mixtures of styrenated phenols with one or more low molecular weight amines, which are di- or poly-amines, or salts thereof; and
   introducing an anchoring element into the hole or crevice simultaneously with or subsequent to the introduction of the fixing mortar.

2. The method according to claim 1, wherein, in the case of (ii), the low molecular weight amine(s) are those of the formula shown under (i) in claim 1.

3. The method according to claim 1, wherein, in the case of (ii), the low molecular weight amine(s) are xylylenediamines, aliphatic polyamines, oligomeric diamines of the formula $H_2N-(CH_2)_i-NH-[(CH_2)_j-NH]_k-(CH_2)_l-NH_2$, wherein i, j and l are each independently of the others from 2 to 4 and k is 0, 1 or 2; cycloaliphatic amines; or amine adducts; or mixtures of two or more thereof.

4. The method according to claim 1, wherein, in the case of (ii), the low molecular weight amine(s) are selected from m-xylylenediamine, 1,3-bis(aminomethyl)cyclohexane (BAC), triethylenetetraamine and isophoronediamine, or mixtures of two or more thereof.

5. The method according to claim 1, wherein, in the case of (i), the specific amines(s) are selected from 1,3-bis(aminomethyl)cyclohexane (BAC), 4-(2-aminoethyl)piperazine, N,N'-bis(3-amino-n-propyl)piperazine, and mixtures of two or more thereof.

6. The method according to claim 1, wherein, in the case of (i), for the Mannich base preparation there are used the styrenated phenols and as aldehydes formaldehyde or a precursor thereof.

7. The method according to claim 6, wherein the content of free phenol is less than 1% by weight of the Mannich base formulation.

8. The method according to claim 1, wherein the ratio by weight of components (a) to (b) is 10 to 1 or less.

9. The method according to claim 1, wherein the ratio by weight of components (a) to (b) is 5 to 1 or less.

10. The method according to claim 1, wherein in the case of (i), the proportion of Mannich base, based on the total weight of the component (b), has a proportion of from 10 to 100% by weight.

11. The method according to claim 1, wherein in the case of (i), the proportion of Mannich base, based on the total weight of the component (b), has a proportion of from 30 to 75% by weight.

12. The method according to claim 1, wherein in the case of (ii), the proportion of the mixture of styrenated phenols and low molecular weight amines, based on the total weight of the component (b), has a proportion of from 10 to 100% by weight.

13. The method according to claim 1, wherein in the case of (ii), the proportion of the mixture of styrenated phenols and low molecular weight amines, based on the total weight of the component (b), has a proportion of from 30 to 75% by weight.

* * * * *